United States Patent
Kronestedt et al.

(10) Patent No.: US 6,308,082 B1
(45) Date of Patent: Oct. 23, 2001

(54) CELL-LEVEL THROUGHPUT ADJUSTMENT IN DIGITAL CELLULAR SYSTEMS

(75) Inventors: Fredric Kronestedt, Stockholm; Göran Malmgren, Hägersten, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/167,707

(22) Filed: Oct. 6, 1998

(51) Int. Cl.[7] ................. H04Q 7/20; H04Q 7/34
(52) U.S. Cl. ............. 455/550; 455/63; 455/69; 455/67.3; 455/67.1; 370/342; 370/335; 370/479; 370/352
(58) Field of Search .................. 455/550, 552, 455/561, 422, 423, 403, 466, 9, 525, 61, 134, 135, 137, 140, 102, 63, 69, 67.3, 67.1, 464, 517; 370/342, 352, 347, 335, 479

(56) References Cited

U.S. PATENT DOCUMENTS

| | | | |
|---|---|---|---|
| 5,590,133 | * 12/1996 | Billstrom et al. | 455/466 |
| 5,592,469 | 1/1997 | Szabo | 370/342 |
| 5,701,294 | 12/1997 | Ward et al. | 370/252 |
| 5,909,469 | * 6/1999 | Frodigh et al. | 455/552 |
| 5,920,545 | * 7/1999 | Rasanen et al. | 455/550 |

FOREIGN PATENT DOCUMENTS

| | | | |
|---|---|---|---|
| 0848515 | 6/1998 | (EP) | H04L/1/12 |
| 9713388 | 4/1997 | (WO) | H04Q/7/38 |
| WO 99/12304 | 3/1999 | (WO) . | |

OTHER PUBLICATIONS

Wireless Networks, vol. 3, No. 1, Mar. 1997, "Unified Power Control, Error Correction Coding and Scheduling for a CDMA Downlink System", Y. Lu et al, pp. 83–90, XP000688203.

* cited by examiner

Primary Examiner—William Trost
Assistant Examiner—Keith Ferguson
(74) Attorney, Agent, or Firm—Jenkens & Gilchrist P.C.

(57) ABSTRACT

In a digital cellular radio communication network, modulation and channel coding for a plurality of radio links of a given cell is determined in response to quality information received during network operation and indicative of communication quality associated with the plurality of radio links. A single modulation and channel coding scheme is determined in response to the quality information, and the single modulation and channel coding scheme is used in each of the links.

24 Claims, 2 Drawing Sheets

CELL-LEVEL THROUGHPUT ADJUSTMENT IN DIGITAL CELLULAR SYSTEMS

FIELD OF THE INVENTION

The invention relates generally to digital cellular systems and, more particularly, to adjustment of throughput in digital cellular systems.

BACKGROUND OF THE INVENTION

In conventional digital cellular systems such as GSM (Global System for Mobile communications) and PDC (Personal Digital Cellular), channel coding is used in the air interface to reduce the bit error rate (BER). Channel coding is also commonly referred to as error control coding, examples of which include block coding and convolutional coding. These and other error control coding techniques are well known in the art.

In some conventional systems, constant channel coding rates are respectively assigned to speech and data communications. The channel coding rate of a given channel coding scheme refers to the amount of redundant bits added to the actual message bits by the coding scheme in order to implement the desired level of error control. Higher channel coding rates can provide a lower BER for a certain quality at the cost of lower throughput, and lower channel coding rates permit higher throughput at the possible cost of higher BER for a certain quality.

One disadvantage with assigning a constant channel coding rate to, for example, all data communications, is that channel capacity might be wasted on a given link between a mobile station (also referred to as a mobile unit) and a base transceiver station if that link has good quality. In such a situation, the link may not require as high a channel coding rate as is provided by the constant channel coding rate, so that at least some of the channel coding bits are unnecessary overhead because a good quality link needs little or no channel coding to achieve an acceptable BER. For poor connections between mobile units and base transceiver stations, the opposite can occur. That is, in order to achieve an acceptable BER, a poor connection may need a higher channel coding rate than the assigned channel coding rate.

One conventional technique directed to solving this problem is to provide multiple modulation and channel coding schemes, and utilize a link adaptation algorithm which attempts to maximize the throughput on the individual radio links between the respective mobile stations and the base transceiver station. This is done by adaptively choosing, from the multiple modulation and coding schemes, the one scheme that achieves the highest throughput on a given link based on the time varying quality of that link. The throughput for each mobile unit is thereby adapted to the "radio" situation of its link, namely the propagation and interference conditions. If the link quality is good (good propagation and interference conditions), then the link adaption algorithm will assign a channel coding scheme having a lower coding rate, while a channel coding scheme having a higher coding rate will be assigned to the link if poor propagation and interference conditions are present.

Conventional link adaptation approaches such as described above typically receive as inputs a number of quality characteristics for each link, for example, (1) downlink and uplink measures of received signal power, (2) downlink and uplink measures of received interference, and (3) downlink and uplink measures of BER.

The aforementioned use of multiple modulation and channel coding schemes with a link adaptation algorithm permits a given digital cellular system to adapt to its operating environment. Because it is difficult to find an "optimal" modulation and coding scheme that will fit every operating environment, it is likely that a modulation and coding scheme optimized for a first environment with relatively favorable propagation and interference conditions will provide insufficient error control in a second environment with relatively poor propagation and interference conditions. Conversely, a modulation and channel coding scheme that is optimized for the second, relatively poorer, environment will likely provide error control that is unnecessary overhead in the first environment. The above-described use of multiple modulation and channel coding schemes which are applied on a per link basis by a link adaptation algorithm is better suited for use with different environments than is the technique of assigning a constant modulation and channel coding scheme without regard to the operating environment.

However, the link adaptation approach typically requires that the aforementioned measures of link quality be measured and reported at regular intervals typically ranging from one to fifty times per second. These reports, which are needed as inputs to the link adaptation algorithm, must of course be transmitted over the air interface, thus requiring a large and expensive amount of overhead in the air interface for transmission of the downlink measurements from the mobile units to the base transceiver stations. Moreover, a more complex communication protocol is required between the mobile units and the base transceiver stations in order to handle the frequent measurements, the corresponding measurement reports, and the potentially frequent changes of the modulation and channel coding scheme in response to the frequently reported measurements. Frequent changes in the modulation and channel coding schemes requires additional complexity in the protocol between the mobile units and the base stations, as well corresponding complexities in the computational capabilities of the mobile units and base stations.

Another disadvantage of the aforementioned link adaptation approach is that it tends to prevent full utilization of conventional power control techniques which are designed to reduce interference and increase the battery life of the mobile units. Whereas the link adaptation approach tries to maximize the throughput of each individual link regardless of the throughput of any other neighboring links, conventional power control techniques attempt to achieve more or less the same quality and thereby the same throughput for all links in the system. Such power control techniques attempt to improve the quality of relatively poor quality links by degrading the quality of relatively high quality links. For example, transmission power in a good quality link will typically be reduced, while transmission power in a poor quality link will typically be increased. In contrast, the link adaptation approach will typically fix the power level of a given link to the maximum allowed power level.

It is therefore desirable to provide, in a digital cellular system, capability of adjusting throughput by adaptively selecting from multiple modulation and channel coding schemes, without the disadvantageous overhead of the conventional link adaptation approaches, and without disadvantageously interfering with conventional power control techniques. This is achieved according to the present invention by providing a relatively slowly adaptive technique which selects a modulation and channel coding scheme from a plurality of possible choices, and applies the selected modulation and channel coding scheme on a cell-level basis.

DETAILED DESCRIPTION

Figure 1:
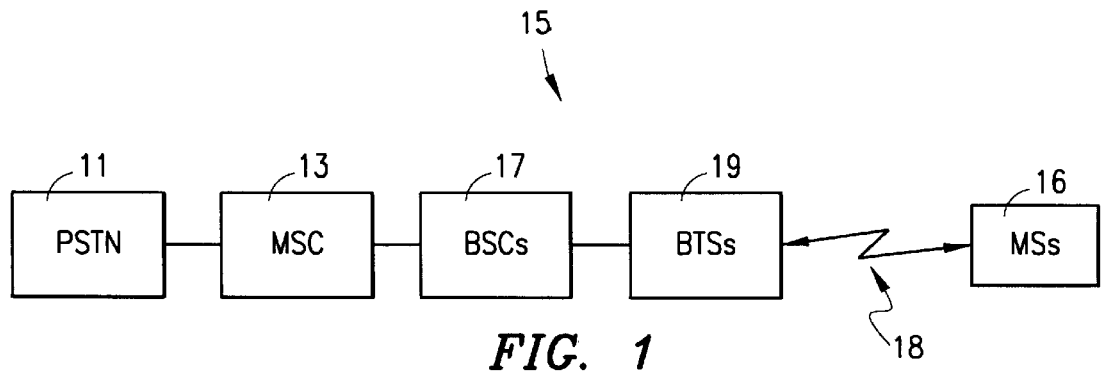
FIG. 1 is a block diagram which illustrates an example of a communication system including a digital cellular radio network according to the invention.

FIG. 1 is a block diagram of an exemplary communications system including a digital cellular communication network according to the present invention. In the example of FIG. 1, a conventional public switched telephone network (PSTN) 11 is coupled to a mobile telephone switching office 13 of a digital cellular communication network 15. The mobile telephone switching office 13 is coupled to a plurality of transceiver controllers illustrated diagrammatically at 17, which controllers in turn control a plurality of fixed-site radio transceivers indicated diagrammatically at 19. The transceivers 19 communicate via an air interface 18 with a plurality of mobile radio transceiver stations (MSs) illustrated diagrammatically at 16. One or more of the fixed-site transceivers serve all mobile stations located in a predetermined geographic area called a cell, as is well-known in the art.

The digital cellular communication network 15 of FIG. 1 can be, for example, a GSM network appropriately modified to include the herein-described features of the present invention. FIG. 1 illustrates that, in a GSM network, the switching office 13 would correspond to a GSM mobile switching center (MSC), the controllers 17 would correspond to GSM base station controllers (BSCs) and the fixed-site transceivers 19 would correspond to GSM base transceiver stations (BTSs). It will be evident to workers in the art that the features of the present invention described hereinafter are also readily applicable to other well known digital cellular communication networks, for example, D-AMPS, PDC, etc.

Figure 2:
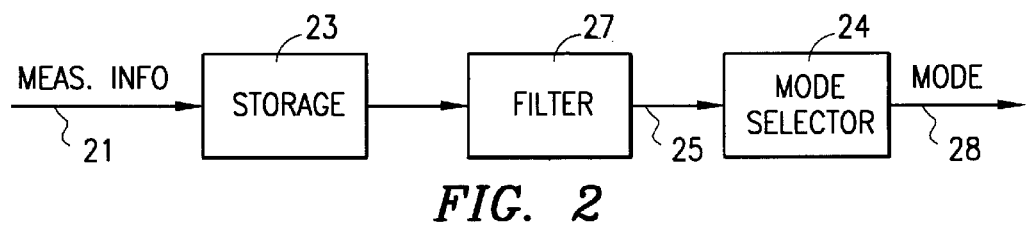
FIG. 2 diagrammatically illustrates a mode determiner according to the invention for determining a modulation and channel coding mode for the radio links of a given cell.

FIG. 2 diagrammatically illustrates an exemplary mode determiner which may be included in, for example, one or more of the transceiver controllers 17 or one or more of the fixed-site transceivers 19 of FIG. 1. Each mode determiner determines a modulation and channel coding mode for a cell associated with that mode determiner. Every radio link in the associated cell will then operate in the selected modulation and channel coding mode. If the mode determiner is provided in a transceiver controller 17, it can be used to determine respective modulation and channel coding modes for all cells served by the fixed-site transceivers 19 that are controlled by the transceiver controller 17.

The exemplary mode determiner of FIG. 2 includes an input 21 for receiving quality measurement information obtained by the mobile stations 16 and fixed-site transceiver (s) 19 of a given cell during conventional operation. For example, the mode determiner can receive at input 21 information indicative of measurements made by the fixed-site transceivers 19 and by the mobile stations 16, of received signal power, received interference, BER, and other conventional measurements. Measurements of these quality factors are already conventionally made by the mobile stations and fixed-site transceivers of the respective cells during conventional operation of digital cellular systems such as GSM.

Indications of downlink quality can also be achieved by monitoring the ARQ in the base stations. For example, the number of performed retransmissions tells whether the downlink has a good quality. ARQ (automatic repeat request) is commonly used in conventional packet data systems.

The cell quality measurement information received at 21 can be stored in data storage 23, for example a memory circuit. The conventional cell quality measurement information can be passed directly to a conventional power controller (not shown) coupled to the storage unit 23. The power controller can use the quality measurement information to implement conventional power control techniques in the radio links of the cell. Such operation of a power controller is well known in the art.

The storage unit 23 has an output connected to a filter 27 which operates on the quality measurement information received for each active link (between a mobile station and a fixed-site transceiver) of a given cell, and provides at 25 corresponding composite quality measurement information for the cell. For example, the filter can provide an average value of the uplink received signal power measurements of every active link of the cell, and an average value of the downlink received signal power measurements for every active link of the cell. Similar average values can be calculated for uplink and downlink interference measurements and uplink and downlink BER. Filtering operations other than averaging may also be implemented as desired. For example, empirical observations may suggest other types of filtering operations.

The filtered (i.e., composite) cell quality measurement information is then applied to a mode selector 24. The mode selector 24 receives the filtered quality measurement values and, based on the filtered measurement values, selects a modulation and channel coding mode from a plurality of possible modes.

Information indicative of the selected modulation and channel coding mode is output at 28 to the mobile stations, for example, either via a broadcast control channel in the air interface (if the mode determiner of FIG. 2 is provided in a fixed-site transceiver 19), or via a fixed-site transceiver 19 (if the mode determiner of FIG. 2 is provided in a transceiver controller 17) which relays the information to the mobile stations via a broadcast control channel in the air interface.

Figure 3:
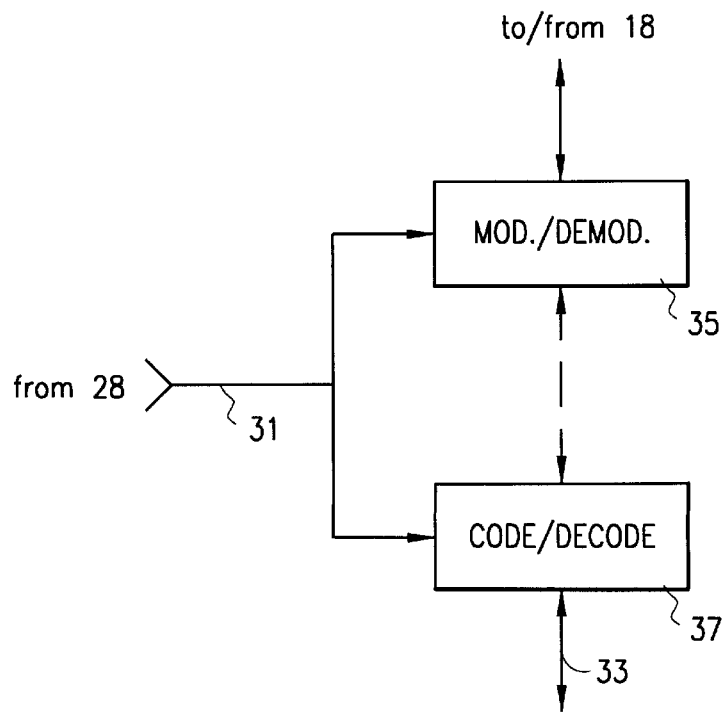
FIG. 3 diagrammatically illustrates example portions of a radio transceiver according to the invention for implementing a modulation and channel coding scheme according to the mode determined by the determiner of FIG. 2.

FIG. 3 diagrammatically illustrates example portions of a radio transceiver for implementing a modulation and channel coding scheme corresponding to the mode information provided by the selector 24 of FIG. 2. The example radio transceiver portions illustrated in FIG. 3 can be provided in the fixed-site transceivers 19 and the mobile stations 16. The transceiver portion of FIG. 3 receives at an input 31 the modulation and channel coding mode information from the mode selector 24 of FIG. 2. This information is provided to a modulation/demodulation section 35, and to a channel code/decode section 37. The broken line portion of FIG. 3 designates unillustrated transceiver portions conventionally coupled between sections 35 and 37, but omitted here as unnecessary to understanding the invention.

The modulation/demodulation section 35 and the channel code/decode section 37 respond to the mode information by implementing the corresponding modulation and channel coding scheme in conventional fashion, for example, the same as in conventional link adaptation operations. Communications pass from the air interface 18 through sections 37 and 35 to an internal communication path 33, and from the internal communication path 33 through sections 35 and 37 to the air interface 18 in conventional fashion, for example, the same as would occur using conventional link adaptation operations.

Figure 4:
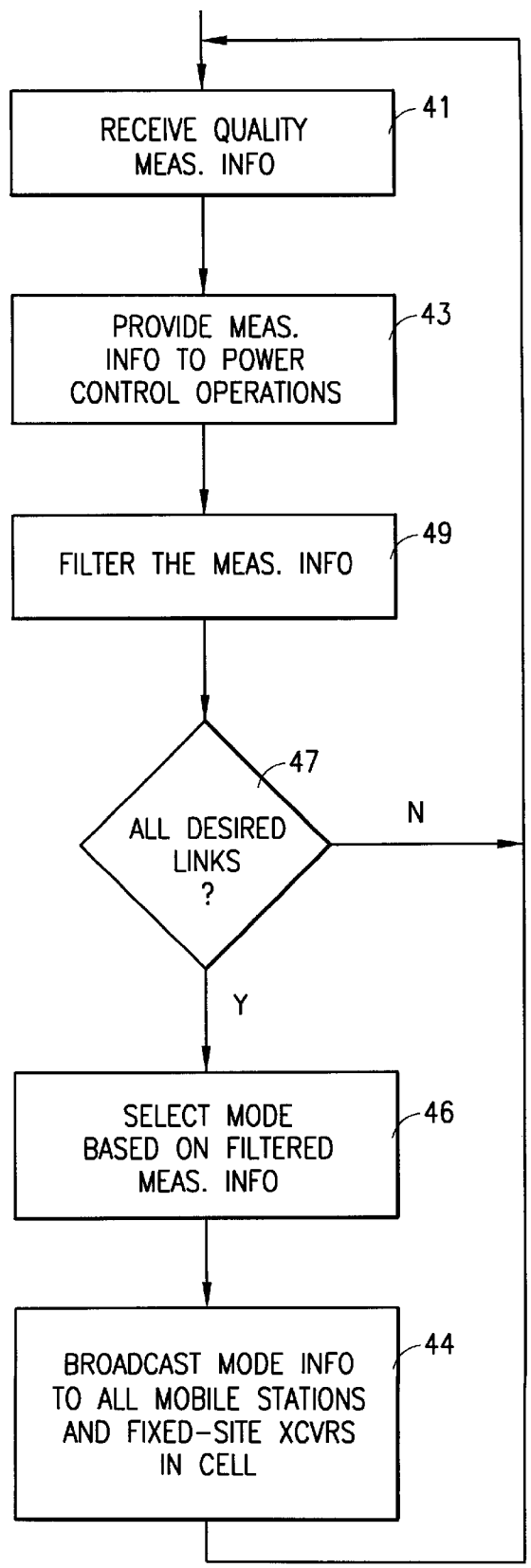
FIG. 4 illustrates in flow diagram format exemplary operations which can be performed by the example mode determiner of FIG. 2.

FIG. 4 illustrates exemplary operations which can be performed by the mode determiner of FIG. 2. Initially at 41, the quality measurement information for the links of the cell is received. As this quality measurement information is received, it can be forwarded to a power controller for execution of conventional power control techniques at 43. The received measurement information is also applied at 49 to the filter 27. When at 47 the desired measurement reports for all (or a suitable representative sampling of all) active links in the cell have been received and filtered, the filtered (i.e., composite) quality information is then applied at 46 to the mode selector 24 which selects the modulation and channel coding mode indicated by the filtered quality measurement information. The selected mode information is thereafter at 44 communicated to all fixed-site transceivers and mobile stations of the cell.

The fixed-site transceivers and mobile stations of the cell respond to this mode information by implementing a modulation and channel coding scheme corresponding to the selected mode. This modulation and channel coding scheme will be implemented by all mobile stations and fixed-site transceivers of the cell, so that all radio links of the cell will operate in the same modulation and channel coding mode.

The desired relationship between composite quality measurement information (output from filter 27) and the modulation and channel coding mode (selected by selector 24), can be readily determined from, for example, empirical observations of which modes provide desired results (e.g., BER and throughput) under given composite quality conditions.

In another embodiment, the mode determiner of FIG. 2 determines an uplink modulation and channel coding mode in response to composite uplink quality measurement information produced by the filter 27, and also determines a downlink modulation and channel coding mode in response to composite downlink quality measurement information produced by the filter 27. The fixed-site transceivers and mobile stations of the cell then implement a corresponding uplink modulation and channel coding scheme for all uplink communications in the cell, and also implement a corresponding downlink modulation and channel coding scheme for all downlink communications in the cell.

It should be clear from the foregoing that the present invention provides a cell-level adaptation technique which specifies a single modulation and channel coding scheme for all radio links of a given cell, such that all radio links in a given cell operate in the same modulation and channel coding mode. Because conventionally available quality measurement reports are used as input to the cell-level adaptation approach, the undesirable overhead associated with the frequent measurement reports used in link adaption approaches can be advantageously avoided. Moreover, because all links in the cell use the same modulation and channel coding scheme, the quality of the various links can also be regulated to a desired target value, for example using conventional power control techniques. There is no need to increase the quality for some links, because the individual links cannot adapt to their specific situation anyway. Thus, the cell-level adaptation approach of the invention advantageously cooperates with conventional power control techniques, rather than tending to operate against them as do prior art link adaptation approaches. Moreover, because the overhead of frequent measurements is not used in the cell-level adaptation approach, and because conventional measurement reports which are already performed in conventional digital cellular networks are advantageously utilized, the cell-level adaptation approach is easily implemented in conventional fixed-site transceivers and mobile stations with little increase in the complexity of their design.

It will be apparent to workers in the art that the invention described with respect to FIGS. 1–4 above can be readily implemented, for example, by suitable improvements in hardware, software or both, in the data processing portions of conventional transceiver controllers, fixed-site transceivers and mobile stations used in conventional digital cellular communication systems.

Although exemplary embodiments of the present invention have been described above in detail, this does not limit the scope of the invention, which can be practiced in a variety of embodiments.

What is claimed is:

1. A method of administering modulation and channel coding in a plurality of radio links of a given cell in a digital cellular radio communication network, comprising:

during operation of the network, receiving individual quality measurements respectively indicative of the quality of at least some of said plurality of radio links, and combining said individual quality measurements together and producing therefrom composite quality information;

determining a single modulation and channel coding scheme to be used in all of said radio links in response to the composite quality information; and in all of the radio links, performing radio transmissions using the single modulation and channel coding scheme.

2. The method of claim 1, wherein said radio links are uplink radio links.

3. The method of claim 1, wherein said radio links are downlink radio links.

4. The method of claim 1, wherein said radio links include both uplink and downlink radio links.

5. The method of claim 1, wherein said combining and producing step includes averaging said individual quality measurements to produce an average quality measurement.

6. The method of claim 1, wherein said combining and producing step includes averaging said individual quality measurements to produce an average quality measurement.

7. The method of claim 1, wherein said receiving step includes receiving information indicative of at least one of uplink received interference and downlink received interference.

8. The method of claim 1, wherein said receiving step includes receiving information indicative of at least one of an uplink received bit error rate and a downlink received bit error rate.

9. The method of claim 1, wherein said receiving step includes receiving information indicative of a number of downlink retransmissions performed during downlink packet channel communications.

10. An apparatus for controlling modulation and channel coding in a plurality of radio links of a given cell in a digital cellular radio communication network, comprising:

an input for receiving, during operation of the network, information indicative of communication quality associated with the plurality of radio links;

a selector coupled to said input for determining, in response to the quality information, a single modulation and channel coding scheme to be used in all of said radio links; and an output coupled to said selector for outputting information indicative of the single modulation and channel coding scheme to be used in all of said radio links.

11. An apparatus for controlling modulation and channel coding in a plurality of radio links of a given cell in a digital cellular radio communication network, comprising:

an input for receiving, during operation of the network, information indicative of communication quality associated with the plurality of radio links;

a selector coupled to said input for determining, in response to the quality information, a single modulation and channel coding scheme to be used in all of said radio links;

a filter coupled between said input and said selector for receiving from said input individual quality measurements which are respectively indicative of the quality of at least some of said plurality of radio links, and further for combining said individual quality measurements together to produce composite quality information, said selector responsive to said composite quality information for determining the single modulation and channel coding scheme; and an output coupled to said selector for outputting information indicative of the single modulation and channel coding scheme to be used in all of said radio links.

12. The apparatus of claim 10, wherein said radio links are downlink radio links.

13. The apparatus of claim 10, wherein said radio links include both uplink radio links and downlink radio links.

14. The apparatus of claim 11, wherein said filter is operable to average said individual quality measurements to produce an average quality measure.

15. The apparatus of claim 10, wherein said quality information includes information indicative of at least one of uplink received signal power measurement and downlink received signal power measurement of at least one active link of the cell.

16. The apparatus of claim 11, wherein said filter is operable to average said individual quality measurements to produce an average quality measure.

17. The apparatus of claim 10, wherein said quality information includes information indicative of at least one of an uplink received bit error rate and a downlink received bit error rate.

18. The apparatus of claim 10, wherein said quality information includes a number of downlink retransmissions performed during downlink packet channel communications.

19. The apparatus of claim 10, provided in a transceiver controller which controls a fixed-site transceiver that communicates with mobile communication stations via the radio links of the cell.

20. The apparatus of claim 10, provided in a fixed-site transceiver which communicates with mobile communication stations via the radio links of the cell.

21. The apparatus of claim 10, wherein the network is one of a GSM network, a D-AMPS network, and a PDC network.

22. The method of claim 1, wherein a cell-level adaptation approach specifies the single modulation and channel coding scheme for all said radio links of a given cell, such that all the radio links in a given cell operate in the same modulation and channel coding mode.

23. The method of claim 22, therein said quality information is used as input to the cell-level adaption approach to avoid an undesirable overhead.

24. The method of claim 22, wherein the communication quality of the radio links in the given cell can also be regulated to a desired target value.

* * * * *

UNITED STATES PATENT AND TRADEMARK OFFICE
CERTIFICATE OF CORRECTION

PATENT NO.      : 6,308,082 B1
DATED           : October 23, 2001
INVENTOR(S)     : Konestedt et al.

It is certified that error appears in the above-identified patent and that said Letters Patent is hereby corrected as shown below:

Column 6,
Lines 39-41, replace "6. The method of claim 1, wherein said combining and producing step includes averaging said individual quality measurements to produce an average quality measurement."
with
-- 6. The method of claim 1, wherein said receiving step includes receiving information indicative of at least one of uplink received signal power and downlink received signal power. --

Lines 59-67,
Replace "10. An apparatus for controlling modulation and channel coding in a plurality of radio links of a given cell in a digital cellular radio communication network, comprising:

an input for receiving, during operation of the network, information indicative of communication quality associated with the plurality of radio links;

a selector coupled to said input for determining, in response to the quality information, a single modulation and channel coding scheme to be used in all of said radio links; and an output coupled to said selector for outputting information indicative of the single modulation and channel coding scheme to be used in all of said radio links."
with
-- 10. An apparatus for controlling modulation and channel coding in a plurality of radio links of a given cell in a digital cellular radio communication network, comprising:

an input for receiving, during operation of the network, information indicative of communication quality associated with the plurality of radio links;

a selector coupled to said input for determining, in response to the quality information, a single modulation and channel coding scheme to be used in all of said radio links;

a filter coupled between said input and said selector for receiving from said input individual quality measurements which are respectively indicative of the quality of at least some of said plurality of radio links, and further for combining said individual quality measurements together to produce composite quality information, said selector responsive to said composite quality information for determining the single modulation and channel coding scheme; and an output coupled to said selector for outputting information indicative of the single modulation and channel coding scheme to be used in all of said radio links. --

UNITED STATES PATENT AND TRADEMARK OFFICE
CERTIFICATE OF CORRECTION

PATENT NO. : 6,308,082 B1
DATED : October 23, 2001
INVENTOR(S) : Konestedt et al.

It is certified that error appears in the above-identified patent and that said Letters Patent is hereby corrected as shown below:

Column 7,
Lines 1-22, replace "11. An apparatus for controlling modulation and channel coding in a plurality of radio links of a given cell in a digital cellular radio communication network, comprising:

an input for receiving, during operation of the network, information indicative of communication quality associated with the plurality of radio links;

a selector coupled to said input for determining, in response to the quality information, a single modulation and channel coding scheme to be used in all of said radio links;

a filter coupled between said input and said selector for receiving from said input individual quality measurements which are respectively indicative of the quality of at least some of said plurality of radio links, and further for combining said individual quality measurements together to produce composite quality information, said selector responsive to said composite quality information for determining the single modulation and channel coding scheme; and an output coupled to said selector for outputting information indicative of the single modulation and channel coding scheme to be used in all of said radio links."
with
-- 11. The apparatus of Claim 10, wherein said radio links are uplink radio links. --

Lines 27-29, replace "14. The apparatus of claim 11, wherein said filter is operable to average said individual quality measurements to produce an average quality measure."
with
-- 14. The apparatus of Claim 10, wherein said filter is operable to average said individual quality measurements to produce an average quality measure. --

Column 8,
Lines 1-3, replace "16. The apparatus of claim 11, wherein said filter is operable to average said individual quality mesurements to produce an average quality measure."
with
-- 16. The apparatus of claim 10, wherein said quality information includes information indicative of at least one of uplink received interference and downlink received interference. --

UNITED STATES PATENT AND TRADEMARK OFFICE
CERTIFICATE OF CORRECTION

PATENT NO. : 6,308,082 B1
DATED : October 23, 2001
INVENTOR(S) : Konestedt et al.

It is certified that error appears in the above-identified patent and that said Letters Patent is hereby corrected as shown below:

<u>Column 8, (continued)</u>
Lines 22-26, replace "22. The method of claim 1, wherein a cell-level adaptation approach specifies the single modulation and channel coding scheme for all said radio links of a given cell, such that all the radio links in a given cell operate in the same modulation and channel coding mode."
with
-- 22. A method of administering modulation and channel coding in a plurality of radio links of a given cell in a digital cellular radio communication network, comprising:

during operation of the network, receiving quality information indicative of communication quality associated with the plurality of radio links;

determining, in response to the quality information, a single modulation and channel coding scheme to be used in all of said radio links, wherein a cell-level adaptation approach specifies the single modulation and channel coding scheme for all of said radio links of a given cell, such that all the radio links in a given cell operate in the same modulation and channel coding mode; and in all of the radio links, performing radio transmissions using the single modulation and channel coding scheme. --

Lines 27-29, replace "23. The method of claim 22, therein said quality information is used as input to the cell-level adaption approach to avoid an undesirable overhead."
with
-- 23. The method of Claim 22, wherein said quality information is used as input to the cell level adaption approach to avoid an undesirable overhead. --

Signed and Sealed this

Third Day of September, 2002

*Attest:*

JAMES E. ROGAN
*Attesting Officer*     *Director of the United States Patent and Trademark Office*